July 29, 1969 — G. CONTI — 3,458,207
SEAL FOR ROTARY MEMBERS
Filed Nov. 2, 1964 — 5 Sheets-Sheet 1

July 29, 1969  G. CONTI  3,458,207
SEAL FOR ROTARY MEMBERS
Filed Nov. 2, 1964  5 Sheets-Sheet 5
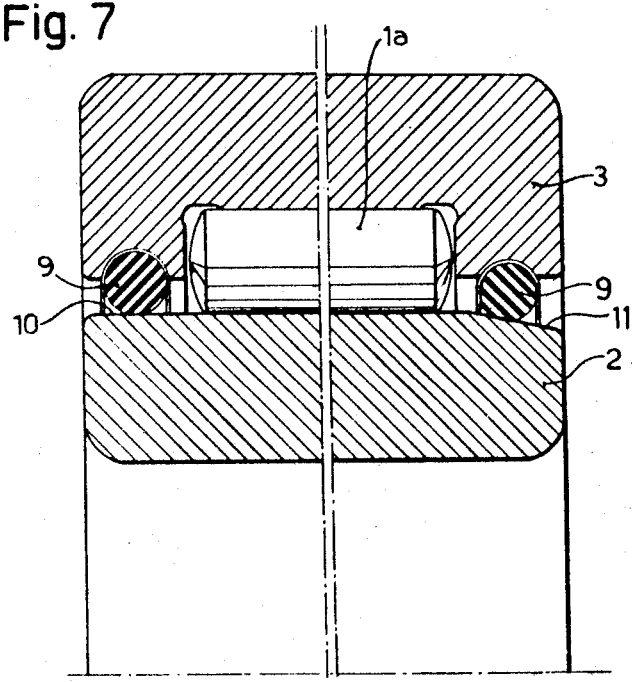
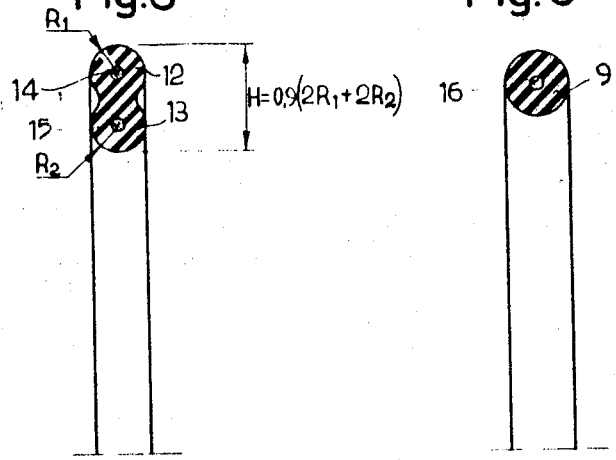

3,458,207
SEAL FOR ROTARY MEMBERS
Giovanni Conti, Turin, Italy, assignor to RIV Officine di Villar Perosa Società per Azioni, Turin, Italy
Filed Nov. 2, 1964, Ser. No. 408,202
Claims priority, application Italy, Dec. 7, 1963, 25,576/63; Aug. 17, 1964, 17,905/64; July 1, 1964, 14,549/64
Int. Cl. F16j 15/34, 15/32
U.S. Cl. 277—83                 6 Claims

ABSTRACT OF THE DISCLOSURE

A protective seal for a pre-lubricated antifriction bearing of the type having antifriction bearing members separating an inner and an outer race, the seal being a resilient, flexible, annular band-like member positioned between the races to protect and seal the antifriction members from any outside source of contamination, grooves in the races cooperating with edges of the annular band-like member so as to provide axial and radial play between said edges and said grooves, thereby constituting the sole means for floatingly mounting the resilient, annular band-like member with a small degree of friction.

---

This invention relates to improvements in protective devices comprising annular members interposed between two concentrical parts, one at least of which is a rotary part, more particularly for pre-lubricated antifriction bearings or other bearings generally.

Protective devices for bearings, more particularly pre-lubricated and other bearings are known, for the purpose of preventing or impeding as far as possible access of dust and foreign bodies generally to the inside of the bearings and supports, as well as leakage therefrom of lubricants.

The known protective devices are generally in the form of annular seals interposed between the two race rings of a bearing, the race rings being stationary and rotary, respectively, or between a rotary shaft and the casing of the stationary support enclosing the bearing carrying said shaft.

The seals can be made of various materials, but are mostly made of a suitable kind of rubber, incorporating substances adapted to obviate or reduce deleterious effects from rubbing of the seal edges against parts with respect to which the said edges should seal.

The above mentioned seals, which are often reinforced by annular metal stiffening screens, are secured by one edge, preferably their outer edge to one race ring of the bearing or the stationary structure of the support, their other edge, preferably their inner edge being resilient and sliding against the other race ring, preferably the inner race ring of the bearing or against the shaft carried by the support.

Such protections for bearings or supports are satisfactory, provided the relative rotary speed of the members between which the annular seal is interposed, is not excessively high. Further factors limiting use of known protective devices are, for instance, the extent of superficial finish of the relatively sliding parts, the specific contact pressure, provision of lubrication, if any, etc.

This invention provides protective devices of the type comprising annular members floatingly interposed between two concentrical parts, one of which at least is a rotary part, more particularly for prelubricated bearings and supports generally, which is effective even at high relative speeds of rotation of the parts between which the protective devices are interposed, to thereby considerably extend the field of use of the protective devices to bearings, supports and further machine parts by making such protective devices less prone to the influence of superficial finish of the relatively moving parts, and of their contact pressure or lubrication.

A further object of this invention is to improve effectiveness of the said protective devices against leaking towards the space in the bearing receiving the rolling bodies, against penetration of foreign bodies, and to simplify the structure of the protective device and of equipment required for manufacture thereof.

With the above and further objects in view this invention provides assembly of the protective devices between the parts of the bearing or support substantially without forcing it in either a radical or axial direction, whereby the relative rotational speed of the said protective device and each of the above mentioned parts is lower than the relative rotational speed of the two parts of the bearing or support.

According to a preferred embodiment of this invention the protective devices are floatingly mounted, that is, they are assembled with a radial and axial play with respect to the parts of the bearing or support, in order to rotate at a speed intermediate between the relative rotational speed of either of said parts with respect to the other, the said intermediate rotational speed of the protective device being determined by the friction arising between the protective device and each of the parts of the bearing or support.

Further characteristic features and advantages of this invention will be clearly understood from the appended description of embodiments given by way of an example on the accompanying drawings, wherein:

FIGURE 7 is an axial sectional view of a needle or roller bearing showing on the right and on the left, respectively, two further constructions according to this invention;

FIGURES 8 and 9 show a constructional detail of the seals according to two further modifications.

Figure 1:
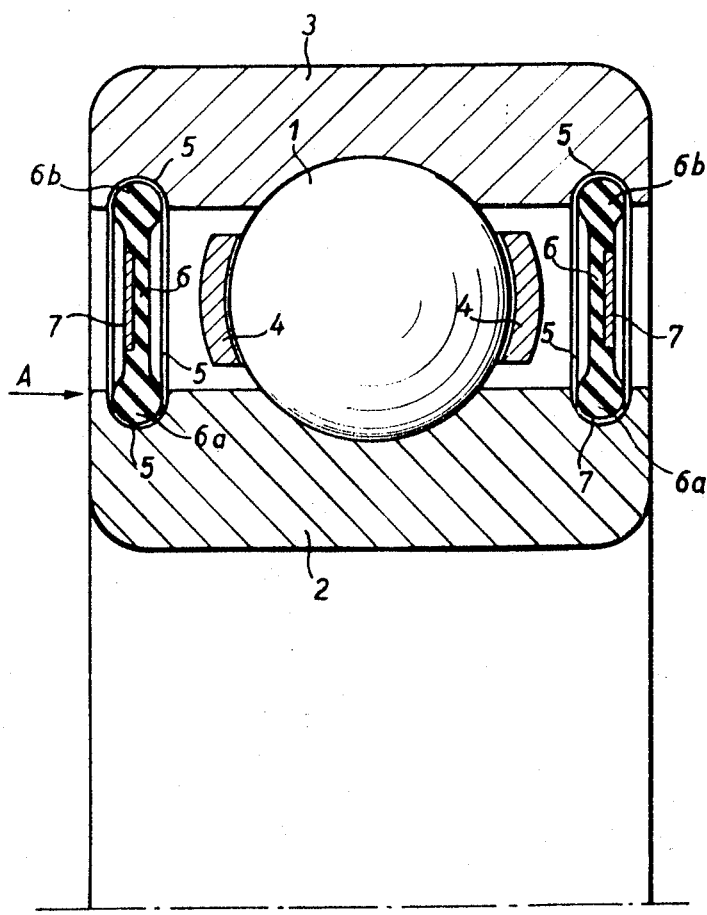
FIGURE 1 is a part axial sectional view of ball bearing incorporating the protective devices according to this invention.
Figure 2:
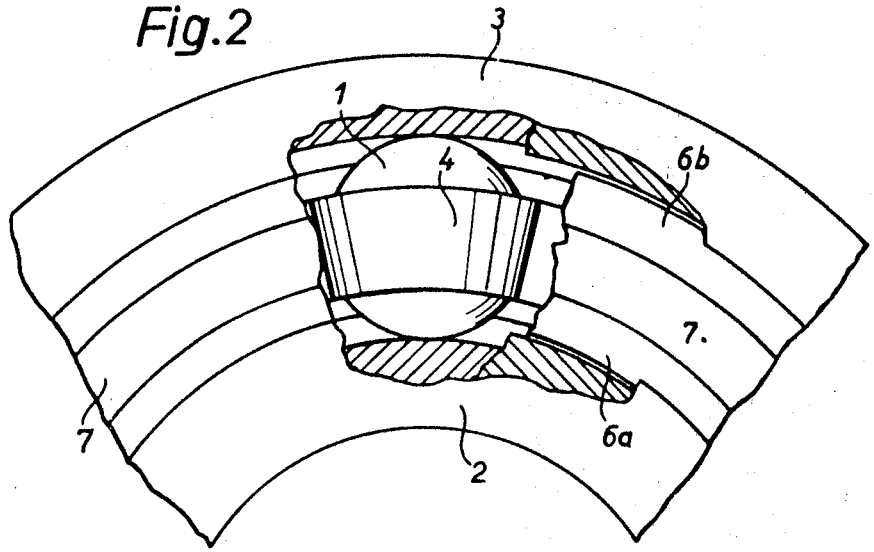
FIGURE 2 is a part elevational view of the bearing according to this invention, looking from the side indicated by arrow A in FIGURE 1.

The bearing shown by way of example in FIGURES 1 and 2 of the drawings in a conventional ball bearing provided on both sides with protective seals. The balls 1 of the bearing are interposed between the outer and inner race rings 2, 3, respectively, each provided with concave tracks for rolling of the balls which are spaced as desired by a cage 4.

On both sides of the ball 1 the opposite surfaces of the inner and outer race rings are formed with two grooves 5, each arranged in proximity to one side face of its respective ring. The grooves receive the enlarged outer portions 6a, 6b in the form of circular fillets of the seals 6, which are made of a suitable type of rubber and are in the form of washers centrally reinforced by metal washers 7.

The dimensions of the grooves 5 with respect to the inner and outer race rings 2, 3, respectively of the bearing and the inner and outer diameters of the seal 6, as well as the radius of the cross sectional area of the fillets 6a, 6b on the seals are selected so that the seal is assembled within the bearing with a certain radial and axial clearance. With this structure during operation of the bearing, the rotational speed of the seal relatively either of the two race rings 2, 3 is inversely proportional to friction between said seal and either of said rings.

The seals can be easily fitted into their seats in the race rings of the bearing by snap action through deformability of the rubber edges of the seal which makes up at the same time for any difference in size possibly occurring during operation on account of the appreciable difference in heat expansion coefficient of rubber and steel.

Figure 3:
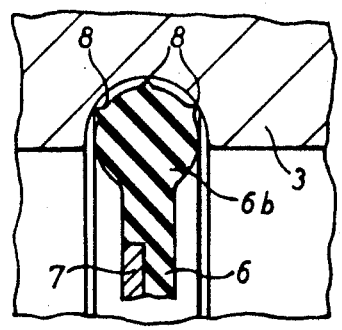
FIGURE 3 is a sectional view on an enlarged scale showing a constructional detail of the bearing according to a modification.

In order to prevent or hinder at least leakage of lubricant from the interior of the bearing to the outside and to properly locate the seals 6 with respect to their respective seats 5 in the bearing, the fillets 6a, 6b at the inner and outer periphery of each seal can be formed with circumferential ribs 8, the crests of which contact the surface of their respective groove 5, as shown in FIGURE 3.

Figure 4:
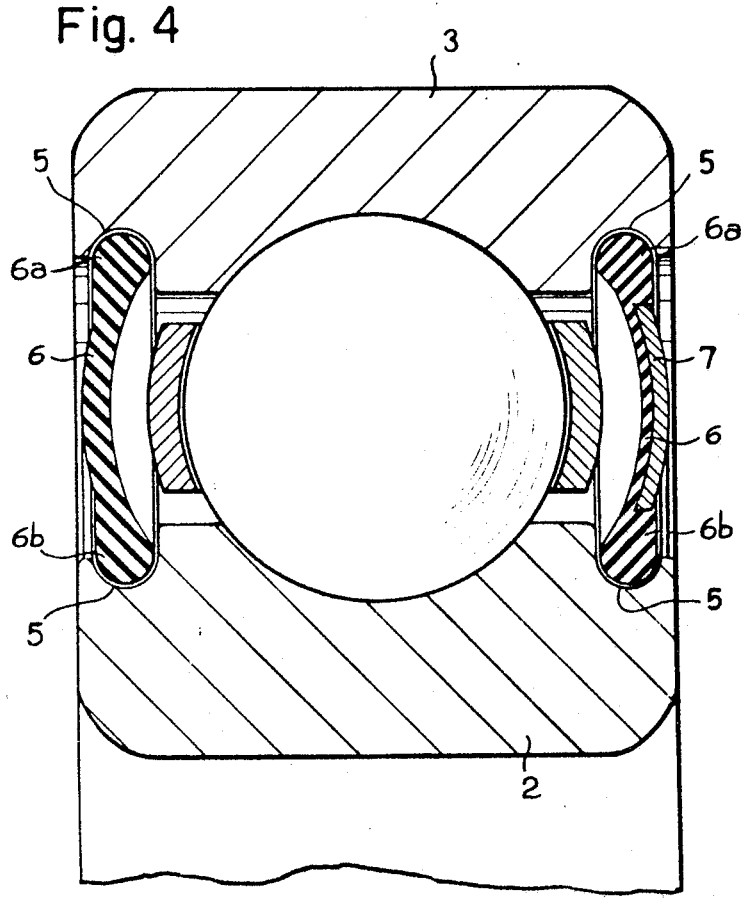
FIGURE 4 is a part axial sectional view of a ball bearing showing on opposite sides of the bearing two bearing two different types of protective devices according to two further modifications.

According to the modification shown in FIGURE 4 the washers 6 acting as seals are of such shape that the profile of one face is concave with respect to a radial plane tangential to the fillets 6a, 6b on one side of the seal, the profile of the other face of the seal extends to the outside of the bearing externally of the radial plane situated on the other side of the seal and tangential to the profile of the abovementioned fillets 6a, 6b. The washer 6 may be of a constant thickness as shown on the left of FIG. 4 or can centrally incorporate on its external side with respect to the bearing a sheet metal washer 7.

Figure 5:
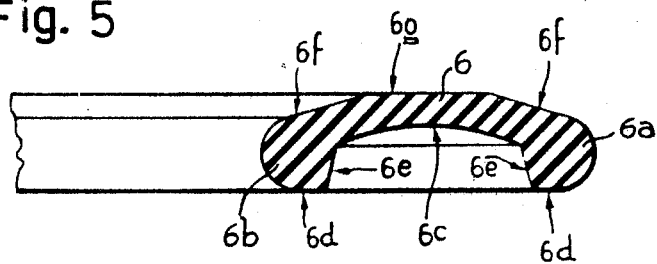
FIGURE 5 is an axial sectional view on an enlarged scale of a detail of a protective device according to a further modification.

According to the modification shown in FIGURE 5 the seal or washer 6 is formed on its concave side with an arcuated profile 6c extending to a region near the circular fillets 6a, 6b, the latter including outer sections of a semi-circular profile followed by radial sections 6d which merge into the middle arcuated section 6c through rectilinear sections 6e inclined through about 15° to the axial direction of the seal.

The profile of the opposite convex face of the seal includes rectilinear sections 6f tangential to the semi-circular portion of the profile of the fillets 6a, 6b, inclined through about 15° to the radial direction of the seal, and a rectilinear intermediate section 6g which is truly radial. The advantage of the above described seals resides in a considerable improvement in tight sealing of the inner space in the bearing accommodating the roller members whenever the outer pressures rises with respect to the pressure within the bearing. This may occur in practice when the bearing cools after prolonged operation having previously caused a rise of its internal temperature or whenever the bearing is assembled on machine operating in compartments in which a pressure is higher than the atmospheric pressure, such as in machines operating under water.

The modifications shown in FIGURES 6 to 9 refer to a protective device for use on bearings supporting machine parts rotating at very high speeds, more particularly roller or needle bearings, in which the size of the annular space between the opposing edges of the rings, accommodating the rolling bodies, is relatively small with respect to the radial dimension of the bearing.

Such protective devices comprise rings including an external and an internal circumferential portion arranged so that the maximum spacing in a radial direction of the said portion is smaller than twice the sum of the radii of curvature of the two profiles.

Figure 6:
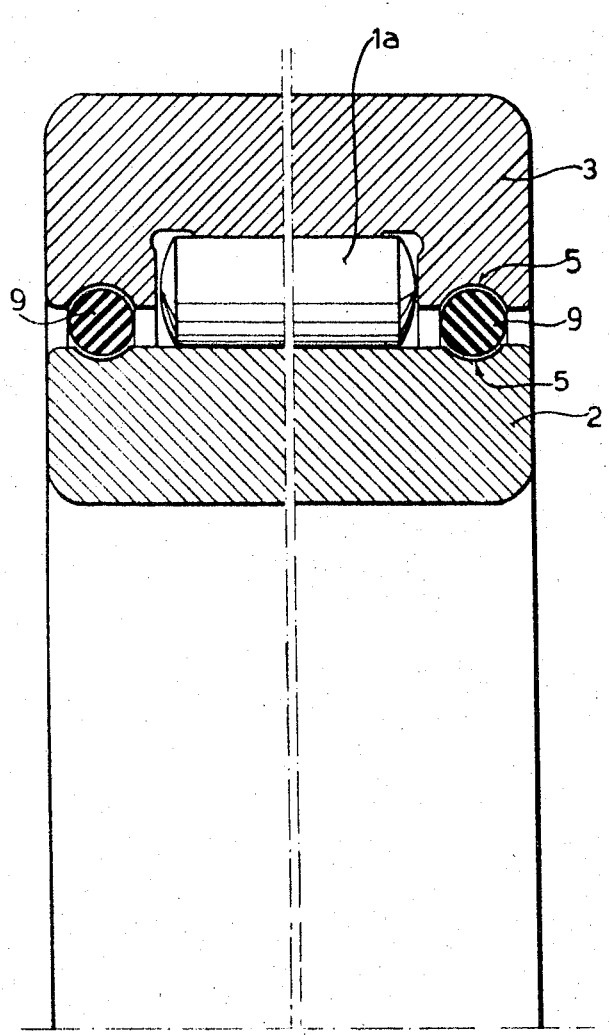
FIGURE 6 is an axial sectional view of a needle or roller bearing provided with protective devices according to a further modification.

The bearings shown in FIGURES 6 and 7 have rollers or needles 1a interposed between the inner and outer race rings, 2, 3, respectively.

The opposite marginal portions of the opposite surfaces of the race rings 2, 3 are formed with pairs of grooves 5 accommodating an outer and inner circumferential portion, respectively, of the seals 9 of circular cross-sectional shape, the said seals being made of rubber or suitable synthetic material.

The annular seals 9 are of such dimension as to leave a radial clearance between their periphery and the surfaces facing the latter of the annular seats 5 in the race rings 2, 3 of the bearing.

According to modifications shown on the left and right, respectively, of FIGURE 7, the outer race ring 3 only of the bearing is formed with annular grooves 5 of an arcuated profile receiving the outer peripheral portion of the seals 9.

The inner peripheral portion of the seals is tangential to the lateral marginal portion of the outer surface of the inner race ring 2 of the bearing, the said portions being of a rectilinear profile in cross section.

In the modification shown on the left of FIGURE 7 the surface 10 of the inner race ring 2 of the bearing, which contacts the inner periphery of the seal 9, is cylindrical in shape, whereas in the modification shown on the right of FIGURE 7 the surface 11 contacting the other seal 9 is conical and tapers towards the outside of the bearing.

In the embodiments shown in FIGURES 6 and 7 the protective devices are in the form of annular seals of circular cross sectional shape. However, should the radial spacing of the opposite surfaces of the lateral marginal portions of the outer and inner race rings of the bearing be wider, a protective device can be used, which is in the form of an annular seal, the profile of which comprises in cross section two lobes merging into each other, denoted by 12 and 13, respectively, in FIGURE 8. If $R_1$ and $R_2$ denote the radii of two profiles of the lobes 12, 13 the total spacing H of the inner and outer circumferential portions of the seal is substantially less than twice the sum of the radii $R_1$ and $R_2$, more particularly $H=0.9$ $(2R_1+2R_2)$.

A reinforcing wire 14, 15, respectively can be inserted in the middle of the curvature of the profile of the lobes. A similar wire can be also inserted into the annular seals of a circular cross sectional shape, as indicated by 16 in FIGURE 9.

As will be understood from the preceding specification, the protective seals are in every case floatingly mounted with respect to the parts of the bearing or support. In addition to the abovementioned advantages, this feature enables the seal to automatically take the most favourable position for easy rotation to take care of any friction arising near its external or internal portion, respectively. The bearing thereby rotates with minimum friction, which is of great importance more particularly when the bearings are subjected to very light loads, when the presence of considerable friction would disturb free rotation of the bearings.

What I claim is:

1. A protective seal for a pre-lubricated anti-friction bearing of the type having anti-friction bearing members separating an inner and an outer race, the seal being a resilient flexible annular band-like member positioned between the races to protect and seal the anti-friction members from any outside sources of contamination, grooves in the races cooperating with edges of the annular band-like member so as to provide axial and radial play between said edges and said grooves, said band-like member being out of engagement with the remainder of the bearing so that the grooves constitute the sole means for floatingly mounting the resilient, annular band-like member whereby the rotational speed of said band-like member is determined solely by the friction arising between said band-like member and the grooves.

2. A protective seal as set forth in claim 1 characterized by the fact that said seal is comprised of a washer or resilient material, such as rubber, provided at the inner and outer circumferential edges thereof with bulges in the form of circular fillets and including a flat intermediate portion disposed in a radial plane.

3. A protective seal as claimed in claim 2 characterized by the fact that a reinforcing metal washer is incorporated in said flat intermediate portion.

4. A protective seal as claimed in claim 1 characterized by the fact that said seal is comprised of a washer of resilient material, such as rubber, provided at the inner and outer circumferential edges thereof with bulges in the form of circular delays and including an intermediate portion shaped to provide in cross-section on one side of said seal a face of a concave profile with respect to a radial plane tangential to said circular fillets and on the other side of the seal a face of convex profile with respect to said radial plane.

5. A protective seal as set forth in claim 4 characterized by the fact that the profile of said concave face of said seal includes an arcuate section merging into the semi-circular outer profile of said circular fillets and the profile of said convex face includes a central section of an arcuate profile connected to the semi-circular profile of said circumferential fillets through an intermediate radially directed section.

6. A protective seal as claimed in claim 4 characterized by the fact that said profile of said concave face of the seal includes an arcuate middle section disposed between diverging rectilinear sections inclined at about 15 degrees to the axial direction of said seal and said profile of the convex face of said seal includes a radially directed middle section disposed between two rectilinear sections inclined at about 15 degrees to said radial plane.

References Cited

UNITED STATES PATENTS

| 2,467,049 | 4/1949 | Peterson | 277—94 |
| 2,720,404 | 10/1955 | Saywell | 277—94 |
| 2,764,433 | 9/1956 | Cobb | 277—94 |
| 3,113,814 | 12/1963 | Ogura | 308—187.2 |
| 3,306,687 | 2/1967 | Smith | 308—187.2 X |

FOREIGN PATENTS

| 978,288 | 4/1951 | France. |
| 634,803 | 9/1936 | Germany. |

LAVERNE D. GEIGER, Primary Examiner

J. S. MEDNICK, Assistant Examiner

U.S. Cl. X.R.

277—94, 95, 177, 235